United States Patent
Entzminger et al.

(10) Patent No.: US 11,449,025 B2
(45) Date of Patent: Sep. 20, 2022

(54) UNIQUE UDTS TO EXPLOIT THE POWER OF THE CONNECTED ENTERPRISE

(71) Applicant: Rockwell Automation Technologies, Inc., Mayfield Heights, OH (US)

(72) Inventors: Rob Allen Entzminger, Shawnee, KS (US); David C. Mazur, Mequon, WI (US); Robert H. Prashad, Mississauga (CA); Noel Henderson, Milton, FL (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/120,863

(22) Filed: Dec. 14, 2020

(65) Prior Publication Data

US 2021/0096525 A1    Apr. 1, 2021

Related U.S. Application Data

(63) Continuation of application No. 15/487,137, filed on Apr. 13, 2017, now abandoned.
(Continued)

(51) Int. Cl.
*G05B 19/042* (2006.01)
*G06Q 10/08* (2012.01)
(Continued)

(52) U.S. Cl.
CPC ... *G05B 19/0426* (2013.01); *G05B 19/41885* (2013.01); *G06Q 10/08* (2013.01);
(Continued)

(58) Field of Classification Search
CPC ......... G06F 17/30604; G06F 17/30917; G06F 8/24; G06F 3/04842; G05B 19/0426;
(Continued)

(56) References Cited

U.S. PATENT DOCUMENTS 9,477,936 B2    10/2016  Lawson
2006/0072626 A1*  4/2006  Hands ................. G06F 16/27
                                                 370/503
(Continued)

FOREIGN PATENT DOCUMENTS

EP    2801935 A1    11/2014
EP    2924561 A2    9/2015

OTHER PUBLICATIONS

Canan Akoglu; The Relationship Between Industrial Design and Interaction Design in Product Development Activities; CHI; pp. 769-775; retrieved on May 27, 2022. (Year: 2012).*
(Continued)

*Primary Examiner* — S. Sough
*Assistant Examiner* — Cuong V Luu

(57) ABSTRACT

Provided herein are systems, methods, and software for facilitating message sessions. In one implementation, a method for building a type-based reporting model associated with an industrial automation environment includes interrogating a system control to acquire a data structure programmed therein, wherein the data structure includes properties of a component of the industrial automation environment. The method also includes correlating the data structure to a type package object, and generating a model object based on the correlation of the data structure to the type package object, the model object configured to visually display the properties of the component on a report.

20 Claims, 15 Drawing Sheets

Related U.S. Application Data

(60) Provisional application No. 62/329,277, filed on Apr. 29, 2016.

(51) Int. Cl.
   *G06Q 50/04*      (2012.01)
   *G05B 19/418*     (2006.01)

(52) U.S. Cl.
   CPC ... *G06Q 50/04* (2013.01); *G05B 2219/23005* (2013.01); *Y02P 90/30* (2015.11)

(58) Field of Classification Search
   CPC .... G05B 19/41885; G05B 2219/23005; G06Q 10/08; G06Q 50/04; Y02P 90/30
   See application file for complete search history.

(56) References Cited

U.S. PATENT DOCUMENTS

| | | |
|---|---|---|
| 2006/0259154 A1 | 11/2006 | Hood |
| 2010/0070852 A1 | 3/2010 | Li |
| 2012/0054650 A1* | 3/2012 | Bliss .................. G06F 3/04847 |
| | | 715/764 |
| 2012/0136881 A1 | 12/2012 | Lacombe |
| 2013/0211559 A1 | 8/2013 | Lawson |
| 2014/0129002 A1* | 5/2014 | Brandes ............. G05B 19/0426 |
| | | 700/83 |

OTHER PUBLICATIONS

Stefan Hodek et al.; Ad hoc field device integration using device profiles, concepts for automated configuration and web service technologies; IEEE; 6 pages; retrieved on May 27, 2022. (Year: 2012).*

* cited by examiner

Items – [RA.CE.IPP]

- ItemTypes — 204, 300
  - RA.CE.IPP.ACB
  - RA.CE.IPP.ACB Current
  - RA.CE.IPP.ACB Energy
  - RA.CE.IPP.ACB Misc Measures
  - RA.CE.IPP.ACB Power
  - RA.CE.IPP.ACB Status
  - RA.CE.IPP.ACB Voltage — 302
  - RA.CE.IPP.Area
  - RA.CE.IPP.CBInput
  - RA.CE.IPP.Country
  - RA.CE.IPP.Enterprise
  - RA.CE.IPP.Equipment
  - RA.CE.IPP.FeederInput
  - RA.CE.IPP.FeederRelay
  - RA.CE.IPP.FR Current
  - RA.CE.IPP.FR Misc Measures
  - RA.CE.IPP.FR Power
  - RA.CE.IPP.FR Thermals
  - RA.CE.IPP.FR Voltage
  - RA.CE.IPP.LVSG
  - RA.CE.IPP.Maintenance
  - RA.CE.IPP.MVSG

RA.CE.IPP

General | Properties | Operations | Security

| Property | Data Type |
|---|---|
| Name | String |
| FullyQualifiedName | String |
| TypeName | String |
| CreatedOn | DateTime |
| ModifiedOn | DateTime |
| Description | String |
| IconIndex | Int32 |
| ItemTypes | Collection (Core.TypeSyste... |
| EnumTypes | Collection (Core.TypeSyste... |
| AccessLevel — 400 | Enumeration |

- Description
- IconIndex
- L1_Current
- L2_Current
- L3_Current
- Maximum_Current
- Active_Energy_Total
- Power_Factor_Total
- Frequency
- Peak_Factor_L1
- Peak_Factor_L2
- Peak_Factor_L3
- Peak_Factor_Ne
- Active_Power_L1
- Active_Power_L2
- Active_Power_L3
- Active_Power_Total
- Reactive_Power_L1
- Reactive_Power_Total
- Apparent_Power_L1
- Apparent_Power_L2

FIG. 4

FactoryTalk Import

Logix Project File
A logix project file (.acd) allows you to import controller structures as VantagePoint Items.

Project Information
A logix project file (.acd) is used to determine the various structures defined in the controller.
Select the current project file (.acd) for 'CLX':

[C:\Projects\IntelligentPackagedPower\PLC Program\PackagedPowerDemoKeithr11.ACD] [...]  ← 902

Note:
This project file should be located in a network directory accessible from the VantagePoint server.
Project name: [PackagedPowerDemo]
Project description: [ ]

Type Package Name
A type package which will be created for this controller. The type package name must be unique.
If necessary, change the name to make the resulting Package name unique.
The suffix ".Package" will be added to the name shown.

Package name: [localhost.ControllerDS.CLX_aa8078a3-c0t0-1317-acaf-a1acc59]  ← 904

[<Back] [Next>] [Cancel]

FIG. 9

UNIQUE UDTS TO EXPLOIT THE POWER OF THE CONNECTED ENTERPRISE

RELATED APPLICATIONS

This application claims the benefit of, and priority to, commonly assigned U.S. patent application Ser. No. 15/487,137, filed on Apr. 13, 2017, entitled "UNIQUE UDTS TO EXPLOIT THE POWER OF THE CONNECTED ENTERPRISE" and to U.S. Provisional Patent Application No. 62/329,277, filed on Apr. 29, 2016, entitled "UNIQUE UDTS TO EXPLOIT THE POWER OF THE CONNECTED ENTERPRISE," both of which are hereby incorporated by reference in their entirety.

TECHNICAL FIELD

Aspects of the disclosure are related to computing hardware and software technology, and in particular to industrial automation applications.

TECHNICAL BACKGROUND

Industrial controllers and their associated I/O devices are central to the operation of modern automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such programming structures.

Because of the large number of system variables that must be monitored and controlled in near real-time, industrial automation systems often generate vast amounts of near real-time data. In addition to production statistics, data relating to machine health, alarm statuses, operator feedback (e.g., manually entered reason codes associated with a downtime condition), electrical or mechanical load over time, and the like are often monitored, and in some cases recorded, on a continuous basis. This data is generated by the many industrial devices that can make up a given automation system, including the industrial controller and its associated I/O, telemetry devices for near real-time metering, motion control devices (e.g., drives for controlling the motors that make up a motion system), visualization applications, lot traceability systems (e.g., barcode tracking), etc. Moreover, since many industrial facilities operate on a 24-hour basis, their associated automation systems can generate a vast amount of potentially useful data at high rates. For an enterprise with multiple plant facilities, the amount of generated automation data further increases The large quantity of data generated by modern automation systems makes it possible to apply a broad range of plant analytics to the automation systems and processes that make up an industrial enterprise or business. Reports, charts, and other human-readable formats are often available or may be created for plant personnel and others wishing to monitor and review the generated data in either a real-time mode or at a later time after the data has been stored.

A report that has been created to display the data of a given industrial automation system may find it difficult to find and display similar data of another industrial automation system. Objects and other components of the other system may be similar or even identical to the first system, but due to even slight variations in component names, for example, during the system set up stage, a disconnect can exist between the data stored in the system and a pre-generated report designed to look for specifically-named objects in the system. Thus, reports previously created may not display all the data they were designed to show.

Creating new reports or even fixing pre-generated reports to show the data generated by a particular system can be a laborious and tedious manual process. This process can require setting up individual connections between data points of the system and the parameter value to be reported for hundreds of parameters or more.

The above-described deficiencies of today's industrial control and business systems are merely intended to provide an overview of some of the problems of conventional systems, and are not intended to be exhaustive. Other problems with conventional systems and corresponding benefits of the various non-limiting embodiments described herein may become further apparent upon review of the following description.

Overview

Provided herein are systems, methods, and software to facilitate building a type-based reporting model associated with an industrial automation environment. In one implementation, a method for building a type-based reporting model associated with an industrial automation environment includes interrogating a system control to acquire a data structure programmed therein, the data structure comprising properties of a component of the industrial automation environment. The method also includes correlating the data structure to a type package object, and generating a model object based on the correlation of the data structure to the type package object, the model configured to visually display the properties of the component on a report.

In another implementation, one or more computer-readable storage medium has program instructions stored thereon, wherein the program instructions, when executed by a computing system, direct the computing system to interrogate a system control to acquire a data structure programmed therein, the data structure comprising properties of a component of the industrial automation environment. The program instructions further direct the computing system to correlate the data structure to a type package object and generate a model object based on the correlation of the data structure to the type package object, the model configured to visually display the properties of the component on a report.

In another implementation, a reporting system to automatically generate reports of an industrial automation environment from a system control of an industrial controller configured to control a machine system comprises a computing system programmed to interrogate the system control to acquire a data structure programmed therein, the data structure comprising properties of a component of the industrial automation environment. The computing system is further programmed to correlate the data structure to a type package object and generate a model object based on the correlation of the data structure to the type package object, the model configured to visually display the properties of the component on a report.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 3 illustrates ItemType objects for a TypeSystem package in an exemplary implementation.

FIG. 4 illustrates properties for an ItemType object in an exemplary implementation.

FIG. 9 illustrates a dialog box in an exemplary implementation.

TECHNICAL DISCLOSURE

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Implementations described herein provide for the generation of model objects from containers including or defining the devices included in the industrial automation system. In one embodiment, the container includes a system control file that, as used herein, includes control logic and execution instructions for control structures found within the control logic for an industrial automation system controller. In another embodiment, the container includes an object description file that, as used herein, includes the control structures but does not include control logic for controlling them. The model objects are created from correlations between the control structures and user-defined data types set up to map the control structures to modelling object equivalents more familiar to a user. The implementations allow for automatic or semi-automatic mapping of attribute, tags, or properties and the corresponding wire-up of the tags to visual modelling objects.

Figure 1:
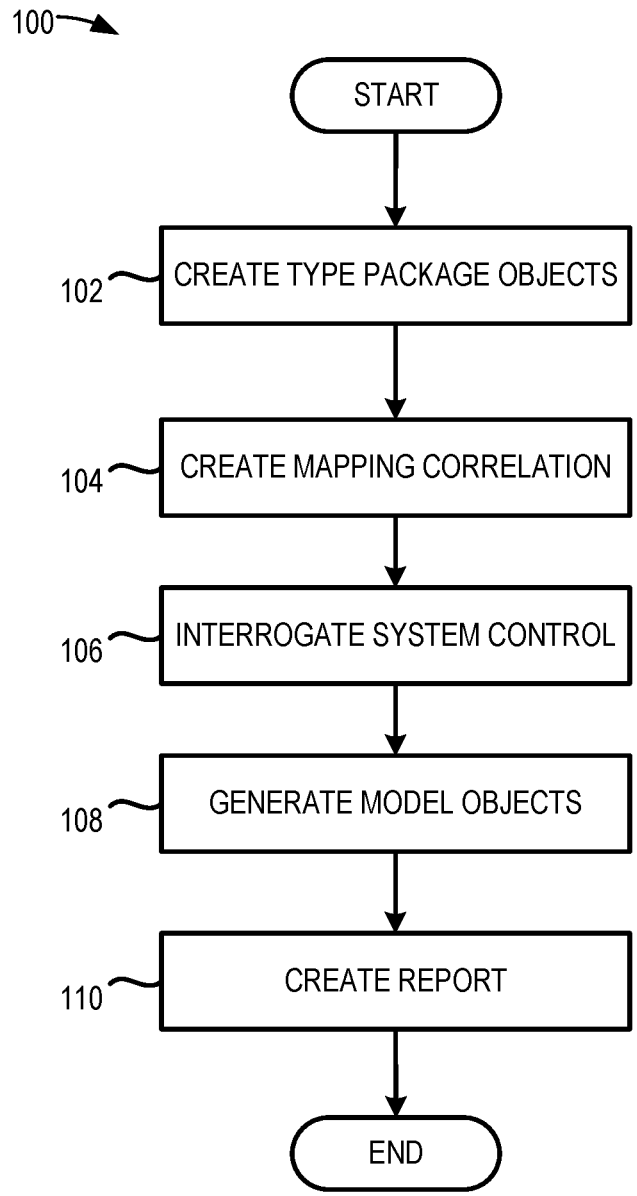
FIG. 1 illustrates flow diagram that illustrates an operation for building a type-based reporting model in an exemplary implementation.
Figure 2:
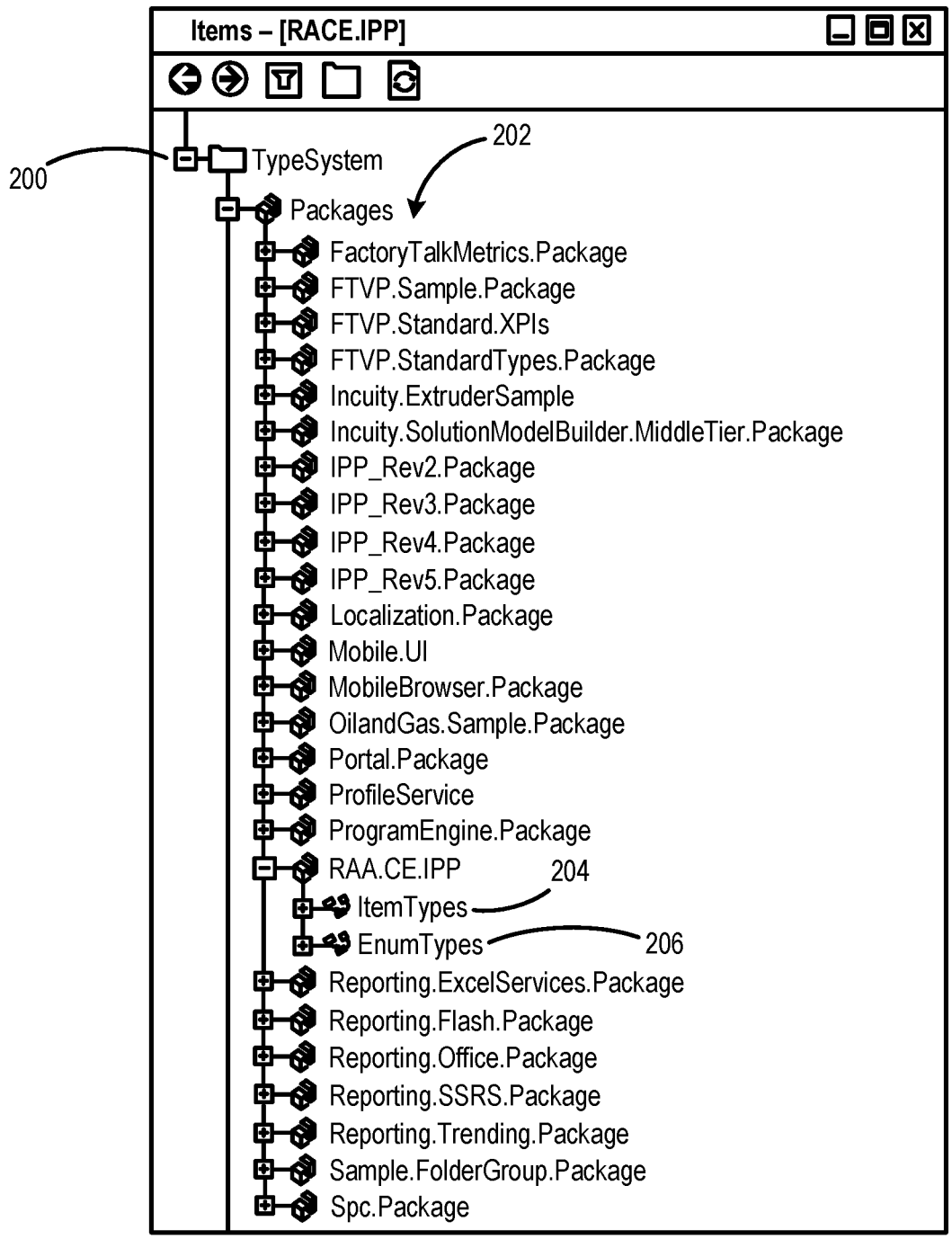
FIG. 2 illustrates a TypeSystem in an exemplary implementation.

FIG. 1 illustrates a flow diagram that illustrates an operation 100 for building a type-based reporting model in an exemplary implementation. Operation 100 begins with defining or creating type package objects at step 102. The type package objects created in step 102 comprise objects or user-defined data types (UDTs) that can be bound to data types found in an industrial automation system. The type package objects correspond with objects that can be visually shown or displayed on a report in order to report on the data collected for these objects in the industrial automation system. As shown in FIG. 2, a TypeSystem object 200 is shown in a folder tree view. A plurality of packages 202 in the TypeSystem object 200 form user types or type packages containing objects that can be found in the industrial automation system. Each package 202 can include ItemType objects 204 and EnumType objects 206. ItemType objects 204 are type package classes or objects that define the system objects.

Referring to FIG. 3, the ItemType objects 204 for the RA.CE.IPP package 202 are shown in an example. An RA.CE.IPP.ACB type package class 300 can be used to define, for example, an air circuit breaker object. An RA.CE.IPP.CBInput type package class 302 can be used to define, for example, a different type of circuit breaker than that defined by RA.CE.IPP.ACB type package class 300. The list of ItemType objects 204 for the RA.CE.IPP package 202 shown in FIG. 3 may not be an exhaustive list, but other objects may be added thereto in embodiments of the invention.

Referring to FIG. 4, each ItemType object 204 can include one or more properties 400 available for that ItemType object 204 in the industrial automation system. The properties 400 shown in FIG. 4 illustrates an example of a portion of the available properties 400 for the RA.CE.IPP.CBInput type package class 302 of RA.CE.IPP package 202.

Referring back to FIG. 1, the creation of type package objects at step 102 includes creating the plurality of packages 202, the pluralities of ItemType objects 204 and EnumType objects 206, and the properties and objects found therein.

Figure 5:
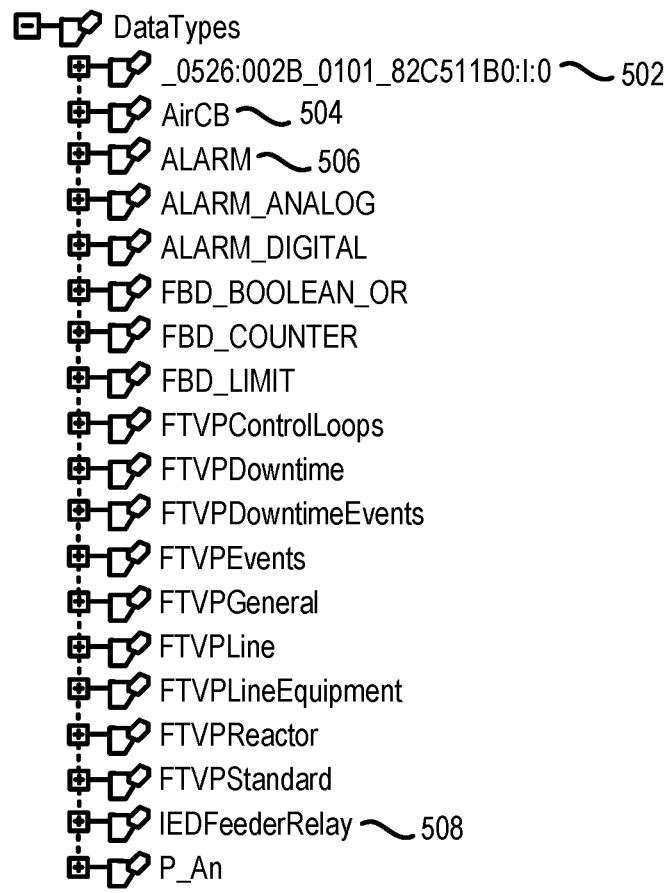
FIG. 5 illustrates a plurality of data types in an exemplary implementation.

After the type package objects are created at step 102, operation 100 includes, at step 104, creation of a mapping correlation of the type packages 202 to objects within an industrial automation controller that are discovered through interrogation of the controller. FIG. 5 illustrates a plurality of data types 500 to match objects that may be found through interrogation of the controller. For example, the plurality of data types 500 includes a "_0526:002B_0101_82C511B0: I:0" data type 502, an AirCB data type 504, an ALARM data type 506, an IEDFeederRelay data type 508, etc. Each of these data types 502-508 may be a data type created and stored within the controller to match objects found in the industrial automation system. However, these data types 500, while known to the controller programmed to control them and collect data therefrom, are not automatically known and bound with objects of a reporting application or service designed to report data collected from the data types 500.

Figure 6:
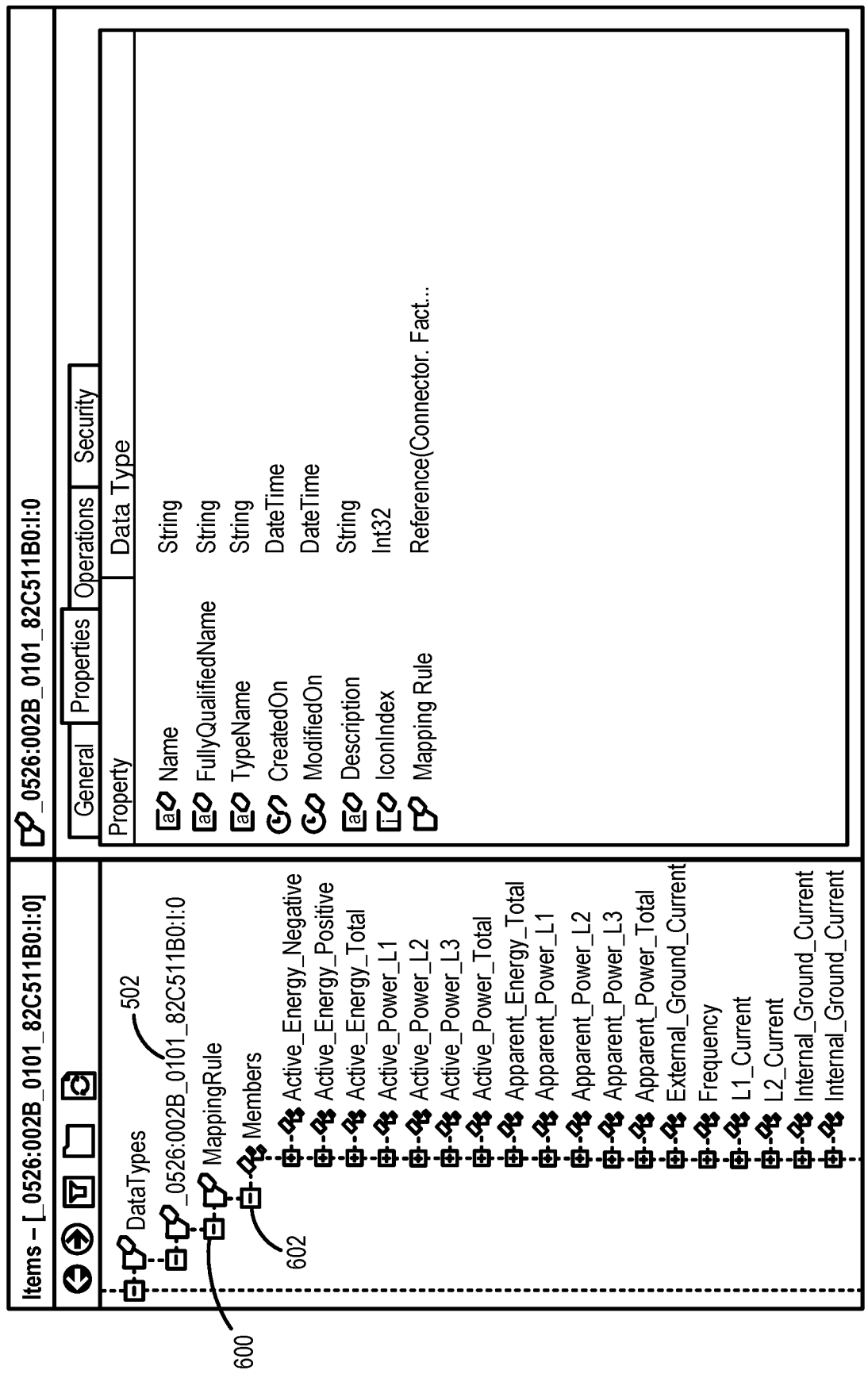
FIG. 6 illustrates data type mapping rules in an exemplary implementation.

As illustrated in FIG. 6, data types 500 can include mapping rules 600 and members 602 defining the mapping rule. As shown, _0526:002B_0101_82C511B0:I:0 data type 502 includes the members 602 that define how to link the properties of the_0526:002B_0101_82C511B0:I:0 object found in the system controller to the type package object 202 created at step 102 of operation 100. Through the mapping rule 600 of the_0526:002B_0101_82C511B0:I:0 data type 502, the_0526:002B_0101_82C511B0:I:0 object found in the system controller can be mapped to the RA.CE.IPP.CBInput type package class 302.

Figure 7:
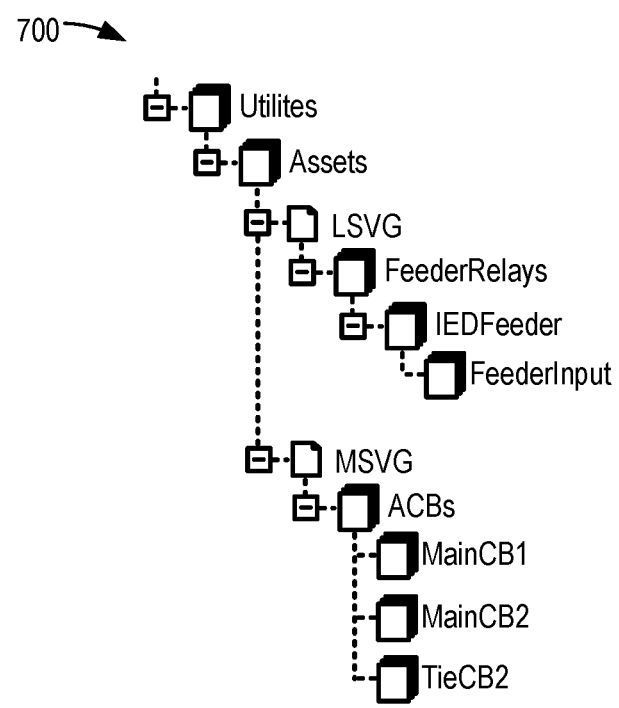
FIG. 7 illustrates a mock industrial automation system in an exemplary implementation.
Figure 8:
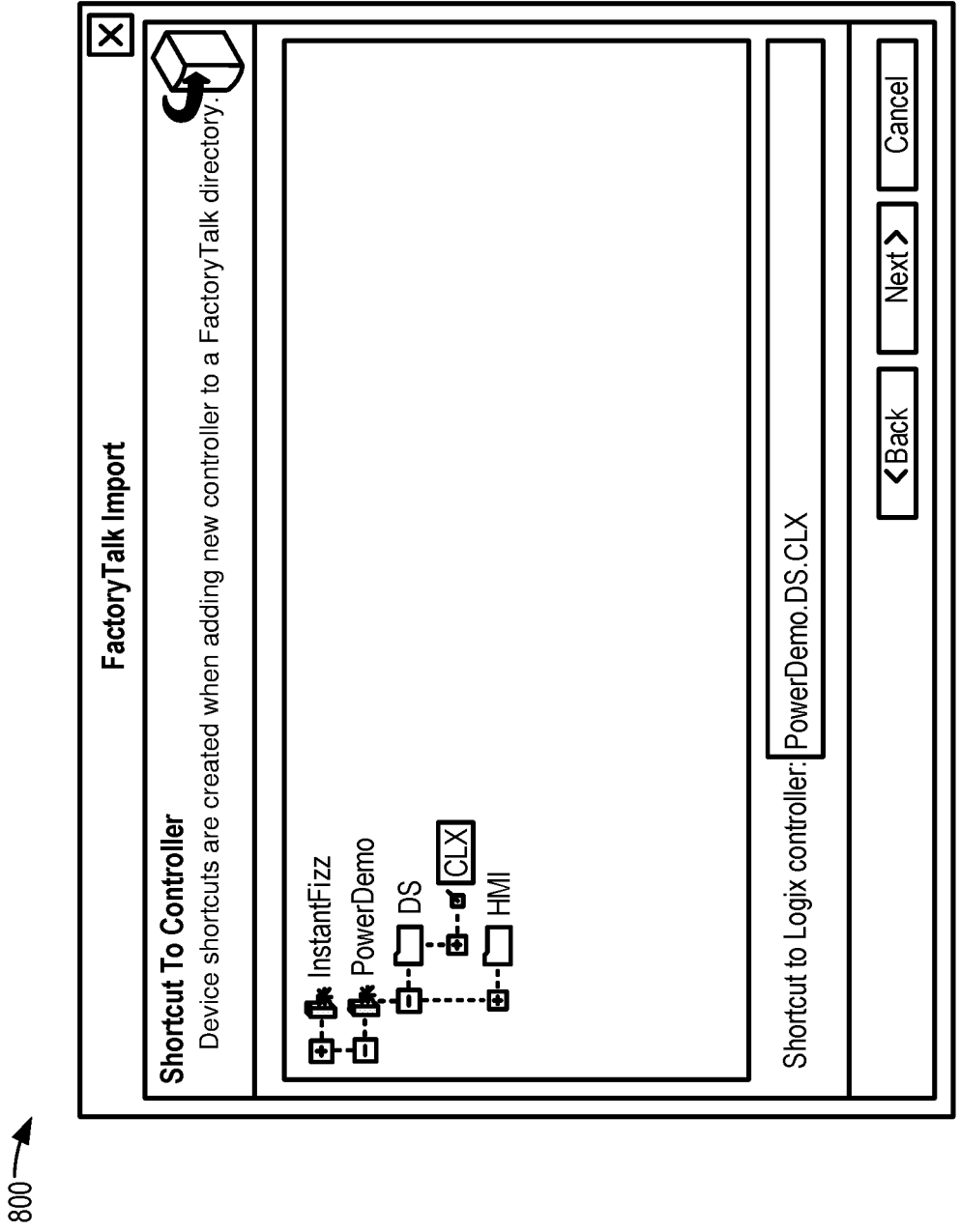
FIG. 8 illustrates a dialog box in an exemplary implementation.

Referring back to FIG. 1, operation 100 continues with interrogation of a system control to find controller objects at step 106. In one embodiment, the system control is the system controller itself, which may be interrogated to find the objects programmed into it. In another embodiment, the system control is a project file used to program the system controller with objects may be interrogated to determine the objects that the system controller must have after being programmed with the project file. FIG. 7 shows a mock industrial automation system 700 set up to illustrate a portion of operation 100 and for which the components thereof are desired to have corresponding model objects created. Interrogation of the system control 106 includes showing a dialog box 800 to a user as shown in FIG. 8 to allow the user to identify where the controller can be found that is programmed with the command system execution file that is to be interrogated. In a succeeding dialog box 900 shown in FIG. 9, the user can identify where the project file for the controller is located 902 in one embodiment. It is the project file 902 that can be interrogated to find the system components or Logix structures of industrial automation system 700.

In another embodiment, rather than identifying where the system control file for the controller is located, the user may identify where the object description file is located. As stated above, the system control file includes control logic and execution instructions for control structures found within the control logic for the controller while the object description file includes the control structures but does not include control logic for controlling them. The object description file may be, for example, a relational database file (e.g., a structured query language database file), a long-term persistence database file (e.g., a historian database file), a JavaScript Object Notation file ("JSON"), a comma-separated values file, an extensible markup language ("XML") file, and the like.

Additionally, dialog box 900 identifies a package name suffix 904 that will be bound with found system components that do not correspond with mapping rules 600 that bind them with any of the packages 202. Such unidentified system components will be bound with a default, generic package type incorporating the package name suffix 904 as part of its object name.

Figure 10:
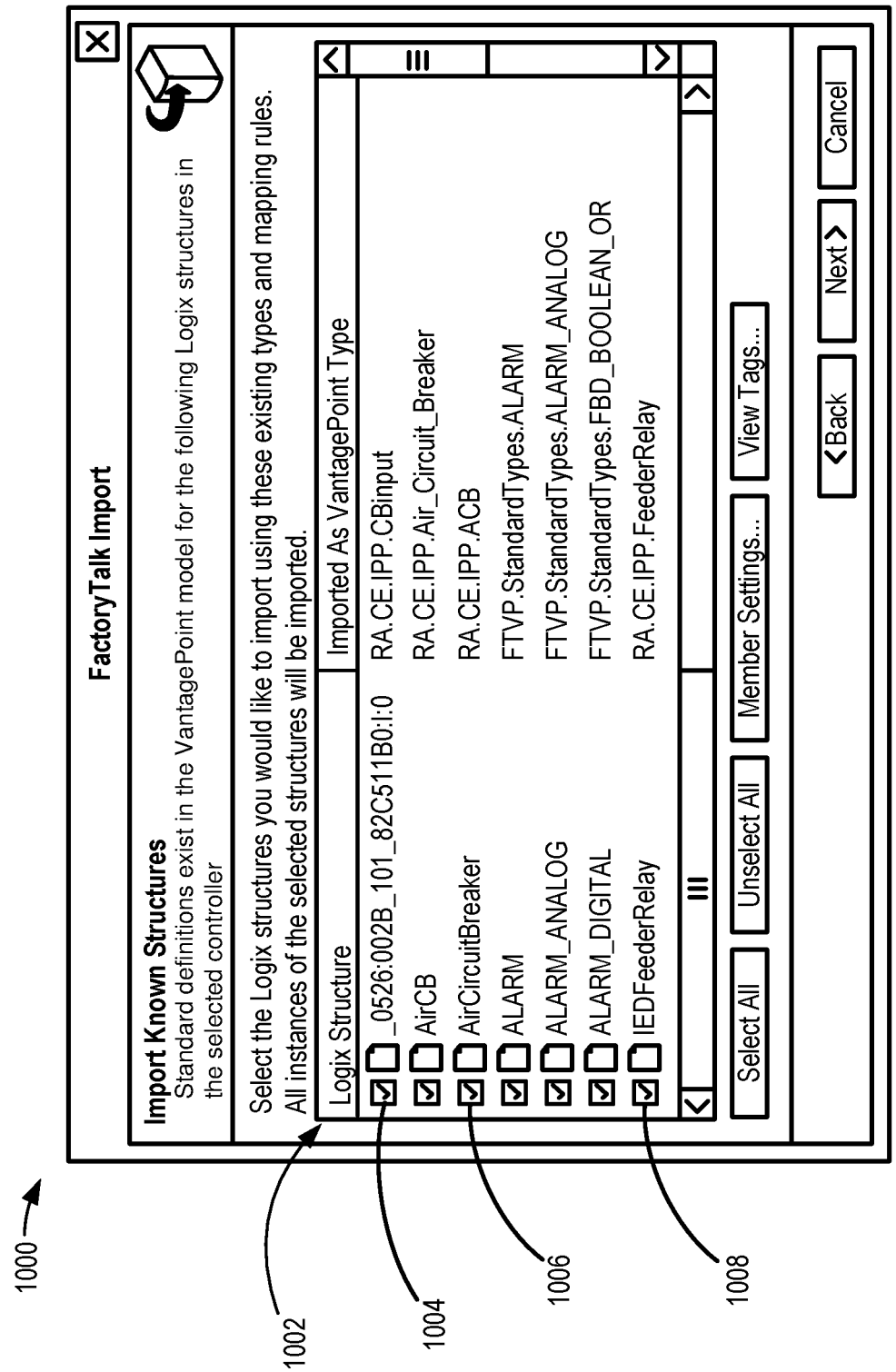
FIG. 10 illustrates a dialog box in an exemplary implementation.

As shown in FIG. 10, a dialog box 1000 lists known controller or Logix structures 1002 to their corresponding type package data types 500 and presents the lists to the user to allow the user to modify the selection of which structures will be imported as model objects. Though a plurality of Logix structures/model objects may be found through interrogation of the controller, a user may decide to import less than all of the objects found.

As indicated in dialog box 1000, a_0526: 002B_0101_82C511B0:I:0 Logix structure 1004 is corre- lated to be imported as an RA.CE.IPP.FeederRelay type, an IEDFeederRelay Logix structure 1006 is correlated to be imported as an RA.CE.IPP.FeederRelay type, and AirCircuitBreaker Logix structure 1008 is correlated to be imported as an RA.CE.IPP.ACB type. That is, for example, because of the mapping rules 600 of the RA.CE.IPP.ACB type that correlate the AirCircuitBreaker Logix structure properties with properties of the RA.CE.IPP.ACB object, interrogation of the system controller leads to the identification of the AirCircuitBreaker Logix structure, and the mapping rules 600 defined that this Logix structure type corresponds with the RA.CE.IPP.ACB type. Other correlations are also shown in FIG. 10. One skilled in the art would recognize that additional Logix structures found in the system controller would be visible to the user through manipulation of the dialog controls on the dialog box 1000.

Figure 11:
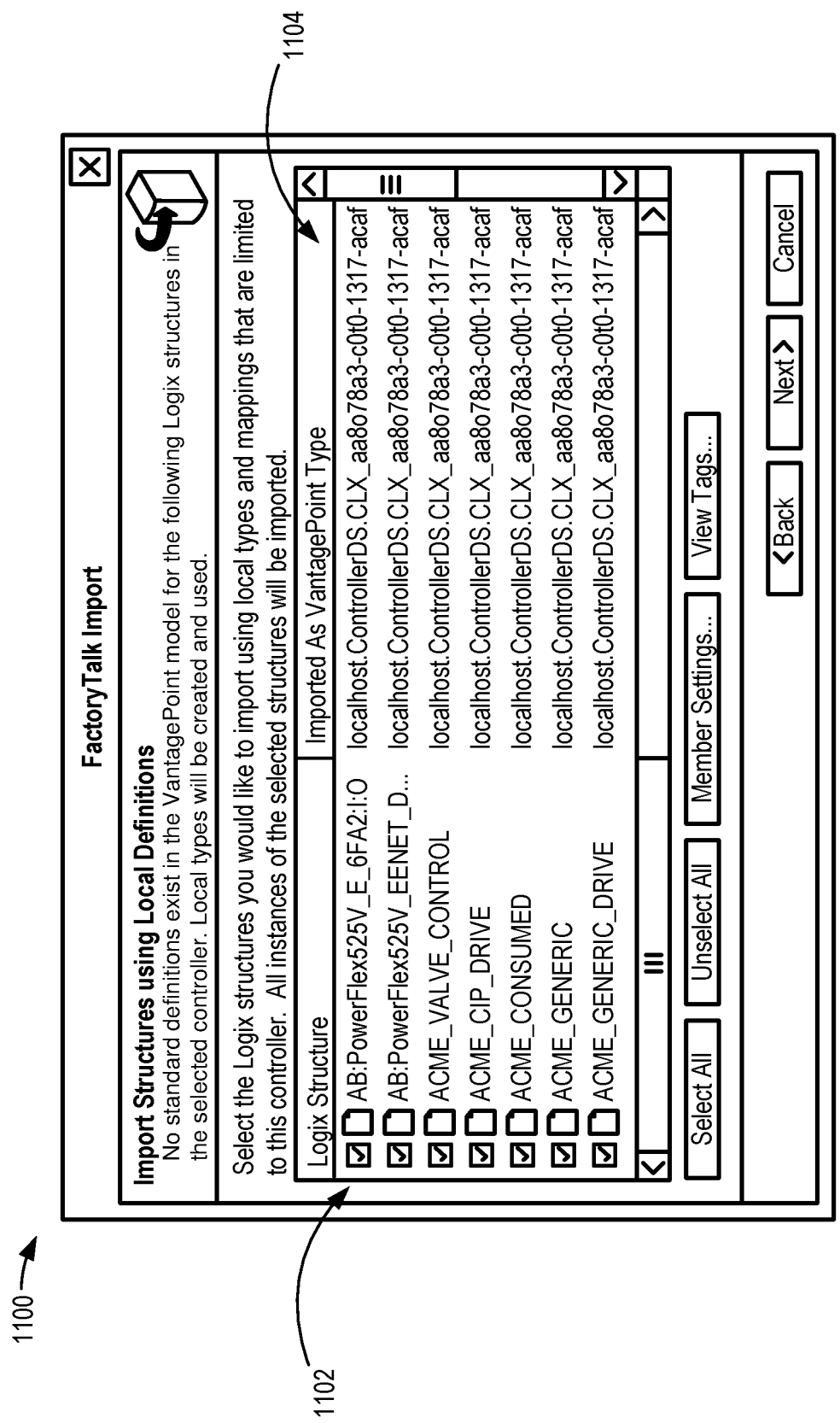
FIG. 11 illustrates a dialog box in an exemplary implementation.

As shown in FIG. 11, a dialog box 1100 lists and presents unknown controller or Logix structures 1102 to the user to allow the user to modify the selection of which structures will be imported as model objects. As indicated in dialog box 1100, since Logix structures 1102 are unknown, no mapping rules were identified to associate any of the unknown Logix structures 1102 to known type packages 202. In this case, a generic type package 1104 will be used for any unknown Logix structures 1102 imported via dialog box 1100.

Referring back to FIG. 1, operation 100 continues with the generation of model objects at step 108 based on the interrogation at step 106. In this step, known Logix structures 1002 are bound with their respective known type package classes 204, and unknown Logix structures 1102 are bound with their respective generic type packages 1104. A model object for each such binding is generated and stored in a library that is made available to a pre-generated report or to a report generation software to allow a user to design a report based on the model objects.

Figure 12:
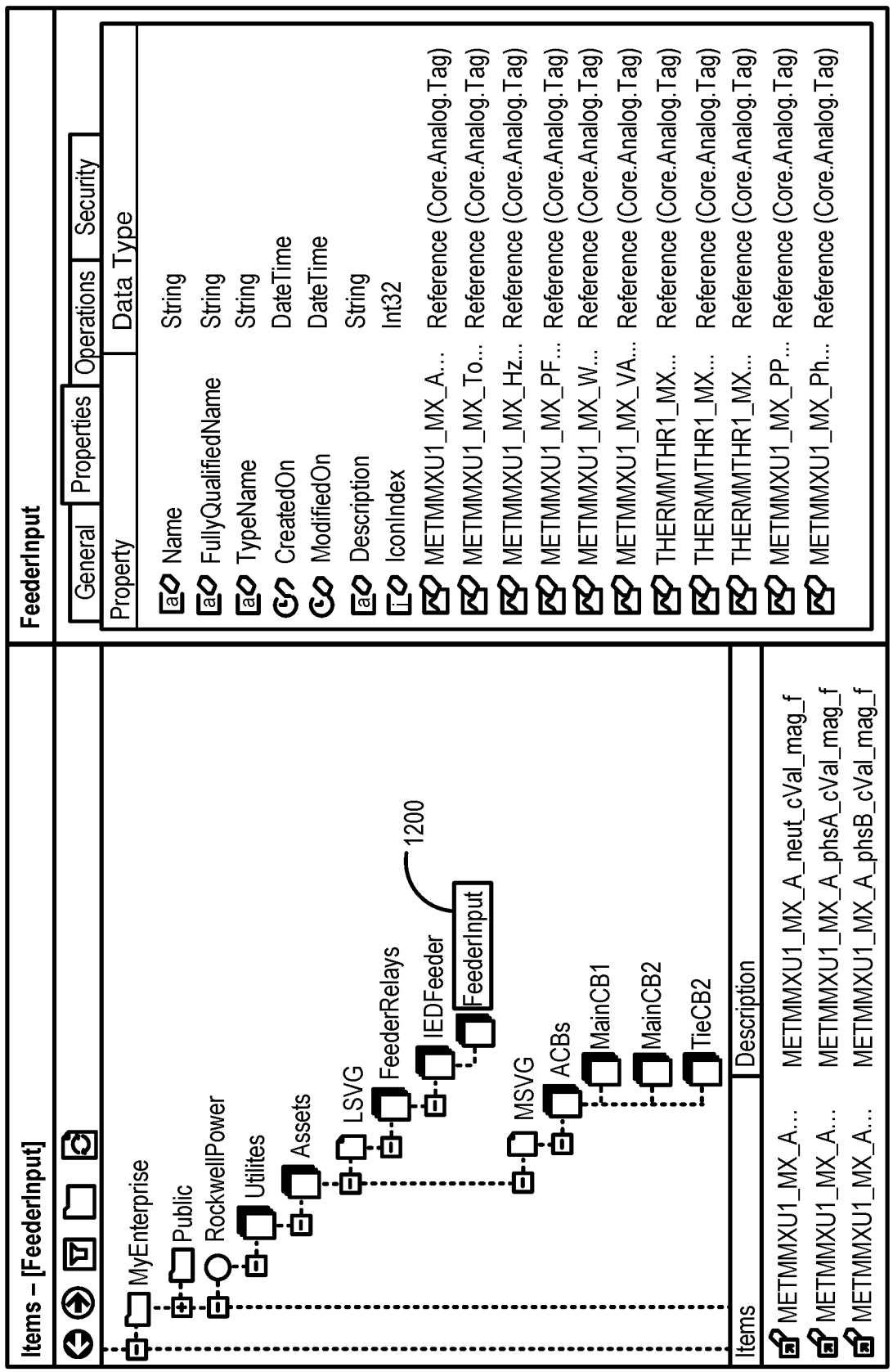
FIG. 12 illustrates properties for a model object in an exemplary implementation.
Figure 13:
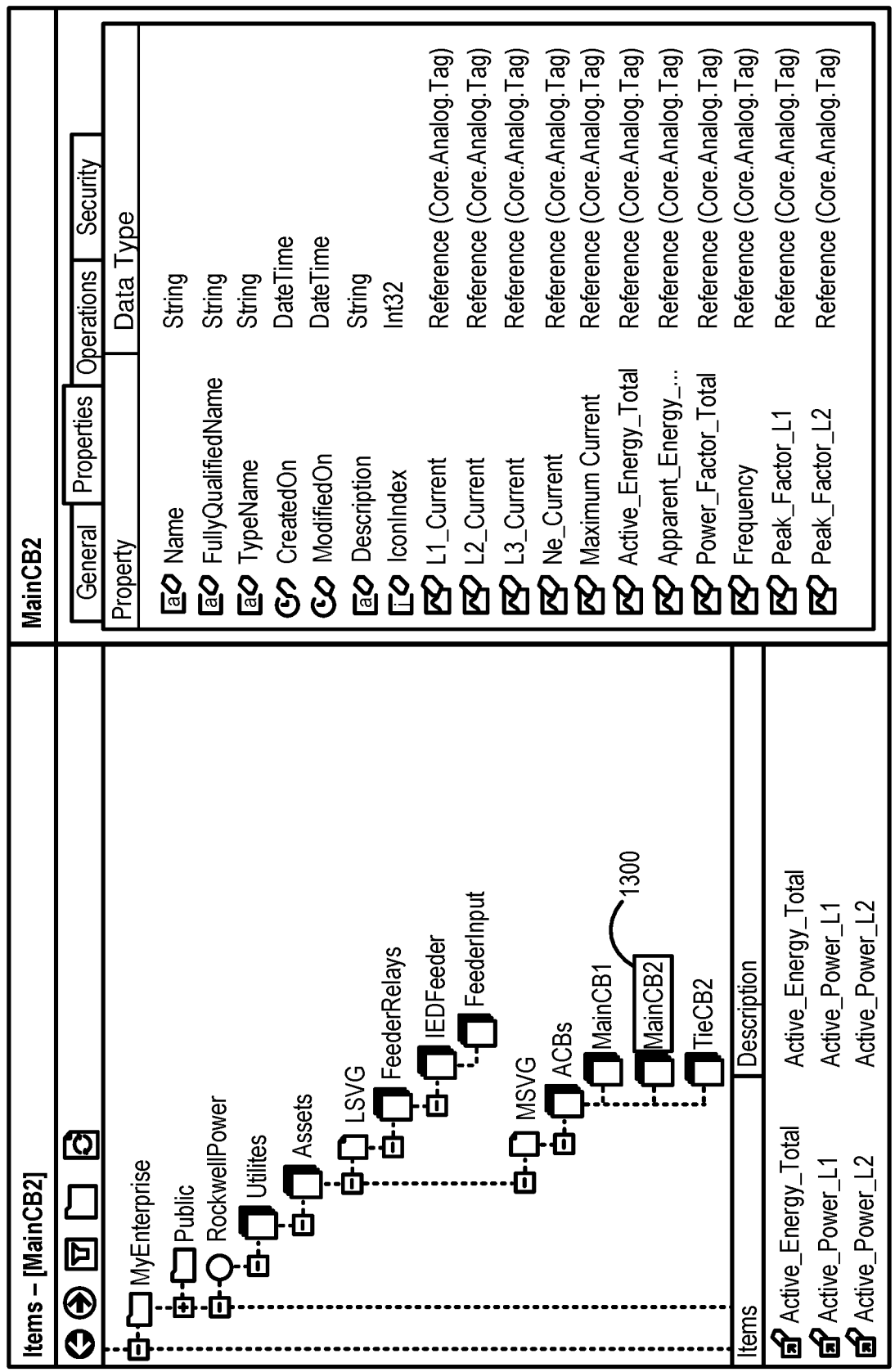
FIG. 13 illustrates properties for a model object in an exemplary implementation.

FIG. 12 illustrates at least some of the properties for a generated RA.CE.IPP.FeederRelay type model object 1200 created from the IEDFeederRelay Logix structure 1006. FIG. 13 illustrates at least some of the properties for a generated RA.CE.IPP.ACB type model object 1300 created from the AirCircuitBreaker Logix structure 1008.

Figure 14:
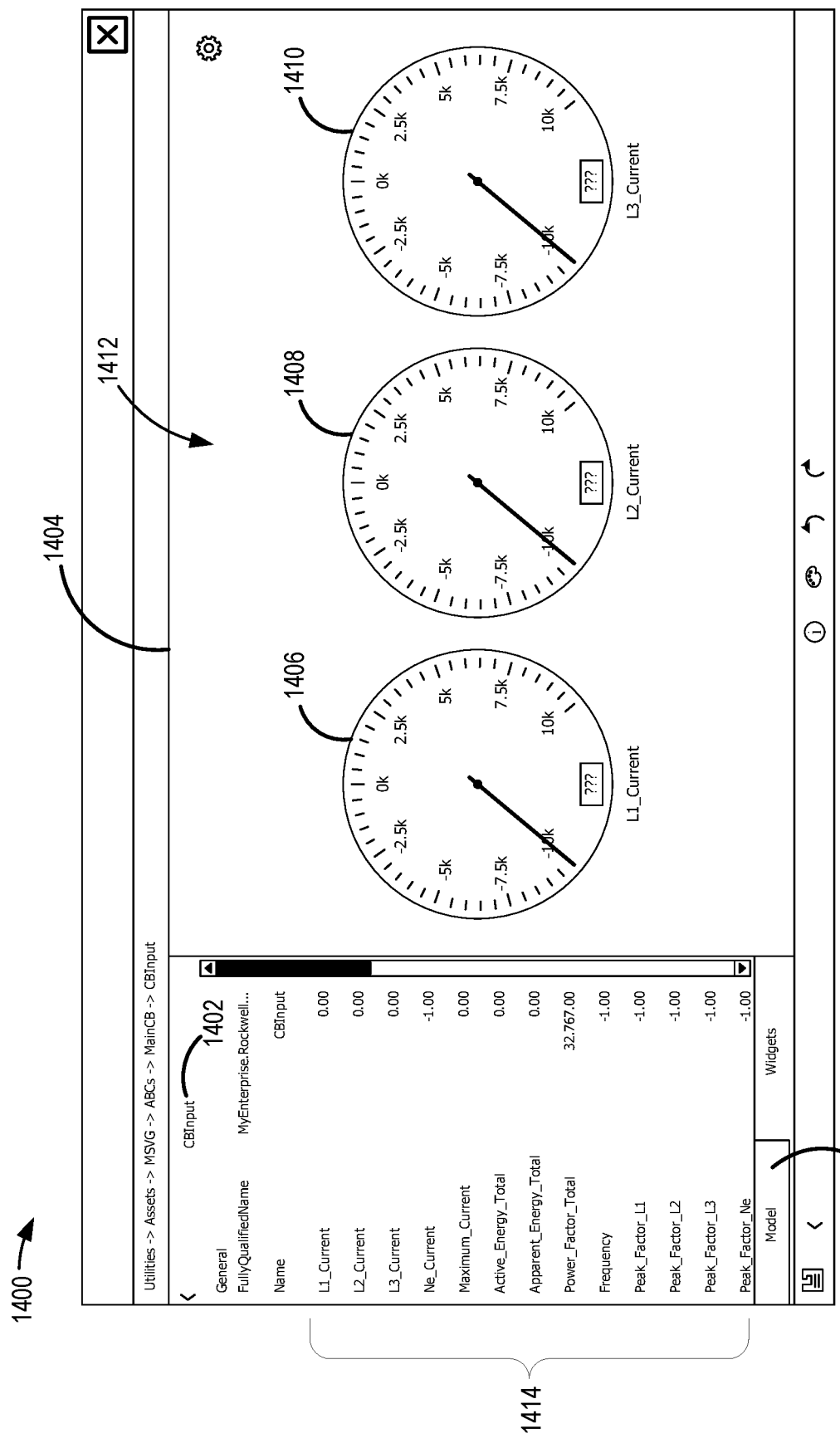
FIG. 14 illustrates a visual model in an exemplary implementation.

Referring back to FIG. 1, operation 100 continues with the creation of a report 110 configured to visually display one or more properties of generated model objects. FIG. 14 illustrates a visual model on a visual display device such as a workstation monitor or mobile device graphical user interface (GUI) that may be created or generated from the object imports. Once the model is created, it can be synchronized for viewing with an information management and decision support system 1400 such as FACTORYTALK VANTAGEPOINT (FTVP) provided by Rockwell Automation, Inc. CBInput model object 1402 based on the imported_0526:002B_0101_82C511B0:I:0 Logix structure 1004 as an example.

The CBInput model object 1400 includes properties such as the L1_Current, L2_Current, and L3_Current properties that may be graphically shown in a reporting pane 1404 of FTVP 1400 to show the respective property values in real time or at a static point in time if desired. Creating the report, as illustrated in FIG. 14, includes placing a plurality of gauge widgets 1406-1410 onto a workspace 1412 of reporting pane 1404. Each widget 1406-1410 corresponds to a respective property 1414 of FTVP 1400 illustrated in a model pane 1416. Widgets 1406-1410 are graphical objects that visually display the corresponding property 1414 on workspace 1412. Placement of widgets 1406-1410 onto workspace 1412 may be accomplished via a drag-and-drop operation of a property 1414 from model pane 1416 to workspace 1412. For example, when the L1_Current property is dragged from model pane 1416 to workspace 1412, FTVP 1400 is programmed to show the L1_Current property as a gauge widget 1406. Other types of procedures for placing widgets 1406-1410 onto workspace 1412 may include menu-driven operations, double-click operations, etc.

A report created in reporting pane 1404 may be further published and made available to a mobile application or to a web-based application for viewing the report or dashboard on another device.

Figure 15:
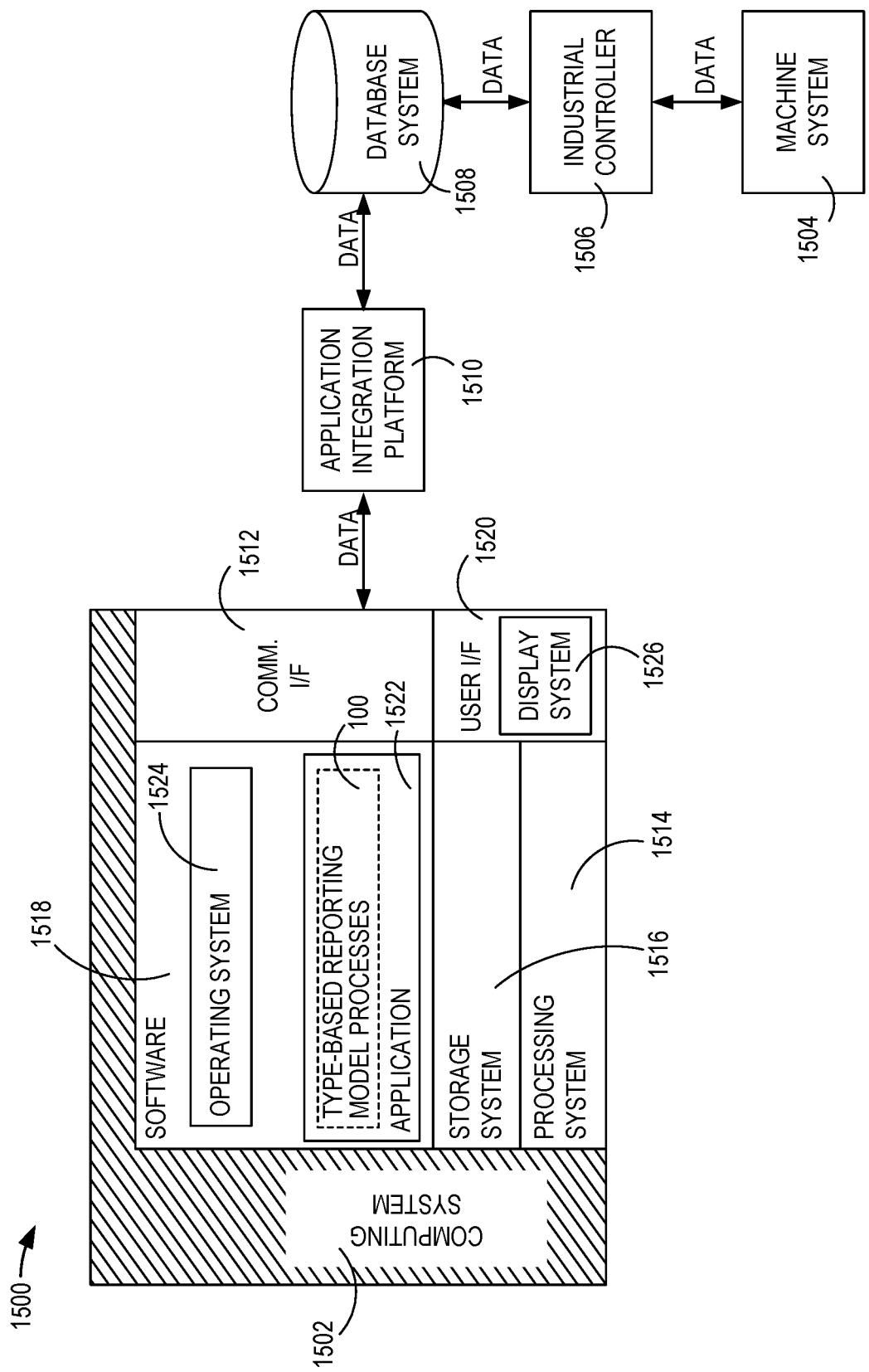
FIG. 15 is a block diagram that illustrates an industrial automation environment in an exemplary implementation.

Turning now to FIG. 15, a block diagram that illustrates an industrial automation environment 1500 in an exemplary implementation is shown. Industrial automation environment 1500 provides an example of an industrial automation environment that may be utilized to implement the operation 100 disclosed herein, but other environments could also be used. Industrial automation environment 1500 includes computing system 1502, machine system 1504, industrial controller 1506, database system 1508, and application integration platform 1510. Machine system 1504 and controller 1506 are in communication over a communication link, controller 1506 and database system 1508 communicate over a communication link, database system 1508 and application integration platform 1510 communicate over a communication link, and application integration platform 1510 and computing system 1502 are in communication over a communication link. Note that there would typically be many more machine systems in most industrial automation environments, but the number of machine systems shown in FIG. 15 has been restricted for clarity.

Industrial automation environment 1500 comprises an automobile manufacturing factory, food processing plant, oil drilling operation, microprocessor fabrication facility, or some other type of industrial enterprise. Machine system 1504 could comprise a sensor, drive, pump, filter, drill, motor, robot, fabrication machinery, mill, printer, or any other industrial automation equipment, including their associated control systems. A control system comprises, for example, industrial controller 1506, which could include automation controllers, programmable logic controllers (PLCs), programmable automation controllers (PACs), or any other controllers used in automation control. Additionally, machine system 1504 could comprise other industrial equipment, such as a brew kettle in a brewery, a reserve of coal or other resources, or any other element that may reside in an industrial automation environment 1500.

Machine system 1504 continually produces operational data over time. The operational data indicates the current status of machine system 1504, such as parameters, pressure, temperature, speed, energy usage, operational equipment effectiveness (OEE), mean time between failure (MTBF), mean time to repair (MTTR), voltage, throughput volumes, times, tank levels, or any other performance status metrics. The operational data may comprise dynamic charts or trends, real-time video, or some other graphical content. Machine system 1504 and/or controller 1506 is capable of transferring the operational data over a communication link to database system 1508, application integration platform 1510, and computing system 1502, typically via a communication network. Database system 1508 could comprise a disk, tape, integrated circuit, server, or some other memory device. Database system 1508 may reside in a single device or may be distributed among multiple memory devices.

Application integration platform 1510 comprises a processing system and a communication transceiver. Application integration platform 1510 may also include other components such as a router, server, data storage system, and power supply. Application integration platform 1510 may reside in a single device or may be distributed across multiple devices. Application integration platform 1510 may be a discrete system or may be integrated within other systems—including other systems within industrial automation environment 1500. In some examples, application integration platform 1510 could comprise a FACTORYTALK VANTAGEPOINT server system provided by Rockwell Automation, Inc.

The communication links over which data is exchanged between machine system 1504, industrial controller 1506, database system 1508, application integration platform 1510, and communication interface 1512 of computing system 1502 could use metal, air, space, optical fiber such as glass or plastic, or some other material as the transport medium—including combinations thereof. The communication links could comprise multiple network elements such as routers, gateways, telecommunication switches, servers, processing systems, or other communication equipment and systems for providing communication and data services. These communication links could use various communication protocols, such as TDM, IP, Ethernet, telephony, optical networking, packet networks, wireless mesh networks (WMN), local area networks (LAN), metropolitan area networks (MAN), wide area networks (WAN), hybrid fiber coax (HFC), communication signaling, wireless protocols, communication signaling, peer-to-peer networking over Bluetooth, Bluetooth low energy, Wi-Fi Direct, near field communication (NFC), or some other communication format, including combinations thereof. The communication links could be direct links or may include intermediate networks, systems, or devices.

Computing system 1502 may be representative of any computing apparatus, system, or systems on which the event data saving processes disclosed herein or variations thereof may be suitably implemented. Computing system 1502 provides an example of a computing system that could be used as either a server or a client device in some implementations, although such devices could have alternative configurations. Examples of computing system 1502 include mobile computing devices, such as cell phones, tablet computers, laptop computers, notebook computers, and gaming devices, as well as any other type of mobile computing devices and any combination or variation thereof. Examples of computing system 1502 also include desktop computers, server computers, and virtual machines, as well as any other type of computing system, variation, or combination thereof. In some implementations, computing system 1502 could comprise a mobile device capable of operating in a server-like fashion which, among other uses, could be utilized in a wireless mesh network.

Computing system 1502 includes processing system 1514, storage system 1516, software 1518, communication interface 1512, and user interface 1520. Processing system 1514 is operatively coupled with storage system 1516, communication interface 1512, and user interface 1520. Processing system 1514 loads and executes software component 1518 from storage system 1516. Software component 1518 includes application 1522 and operating system 1524. Application 1522 may include operation 100 in some examples. When executed by computing system 1502 in general, and processing system 1514 in particular, software component 1518 directs computing system 1502 to operate as described herein for operation 100 or variations thereof. In this example, user interface 1520 includes display system 1526, which itself may be part of a touch screen that also accepts user inputs via touches on its surface. Computing system 1502 may optionally include additional devices, features, or functionality not discussed here for purposes of brevity.

The functional block diagrams, operational sequences, and flow diagrams provided in the figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method for building a type-based reporting model associated with an industrial automation environment, the method comprising:
by a system comprising a processor, identifying type package objects and mapping rules for mapping the type package objects to control structures programmed in industrial controllers;
identifying, by the system and based at least on a mapping rule of the mapping rules, a control structure for a component of the industrial automation environment programmed in an industrial controller; and
in response to determining, based at least on the mapping rule, that the control structure corresponds to a type package object of the type package objects:
executing, by the system, a correlation of the control structure to the type package object; and
generating, by the system and based at least on the correlation of the control structure to the type package object, a graphical object configured to enable display in a user interface of a property of the control structure based at least on the mapping rule.

2. The method of claim 1 further comprising:
in response to determining that the control structure corresponds to the type package object, displaying a dialog box in the user interface, wherein the dialog box identifies the control structure and the type package object; and
receiving user input via the dialog box comprising a confirmation of the correlation of the control structure to the type package object.

3. The method of claim 2 further comprising receiving second user input via the dialog box, wherein the second user input specifies a name of a project file, wherein the project file includes the control structure programmed in the industrial controller.

4. The method of claim 3 further comprising receiving third user input via the dialog box, wherein the third user input includes a name of a package, wherein the package is configured to store the correlation.

5. The method of claim 3 wherein the project file is used to program the industrial controller to control the industrial automation environment.

6. The method of claim 1 wherein the type package objects comprise properties configured to be bound to the control structures of the industrial automation environment.

7. The method of claim 1 wherein the mapping rule is configured to correlate at least the property of the control structure to at least a respective property of the type package object.

8. The method of claim 1 wherein executing the correlation of the control structure to the type package object comprises binding, by the system, at least the property of the control structure to at least a respective property of the type package object.

9. One or more non-transitory computer-readable medium having stored thereon instructions that, in response to execution, cause a system comprising a processor to perform operations, the operations comprising:
identifying type package objects and mapping rules for mapping the type package objects to control structures programmed in industrial controllers;
identifying, based at least on a mapping rule of the mapping rules, a control structure for a component of an industrial automation environment programmed in an industrial controller; and
in response to determining, based at least on the mapping rule, that the control structure corresponds to a type package object of the type package objects:
executing a correlation of the control structure to the type package object; and
generating, based at least on the correlation of the control structure to the type package object, a graphical object configured to enable display in a user interface a property of the control structure based at least on the mapping rule.

10. The one or more non-transitory computer-readable medium of claim 9 wherein the operations further comprise:
in response to determining that the control structure corresponds to the type package object, displaying a dialog box in the user interface, wherein the dialog box identifies the control structure and the type package object; and
receiving user input via the dialog box comprising a confirmation of the correlation of the control structure to the type package object.

11. The one or more non-transitory computer-readable medium of claim 10 wherein the operations further comprise receiving a second user input via the dialog box, wherein the second user input specifies a name of a project file, wherein the project file includes the control structure programmed in the industrial controller.

12. The one or more non-transitory computer-readable medium of claim 11 wherein the operations further comprise receiving third user input via the dialog box, wherein the third user input includes a name of a package, wherein the package is configured to store the correlation.

13. The one or more non-transitory computer-readable medium of claim 11 wherein the project file is used to program the industrial controller to control the industrial automation environment.

14. The one or more non-transitory computer-readable medium of claim 9 wherein the mapping rule is configured to correlate at least the property of the control structure to at least a respective property of the type package object.

15. The one or more non-transitory computer-readable medium of claim 9 wherein executing the correlation of the control structure to the type package object comprises binding at least the property of the control structure for the component to at least a respective property of the type package object.

16. A reporting system to automatically generate reports of an industrial automation environment from a system control of an industrial controller configured to control a machine system, the reporting system comprising:
 a memory that stores executable components; and
 a processor, functionally coupled to the memory, that executes the executable components, the executable components comprising:
 a reporting component configured to:
 identify type package objects and mapping rules for mapping the type package objects to control structures programmed in industrial controllers;
 identify, based at least on a mapping rule of the mapping rules, a control structure for a component of the industrial automation environment programmed in an industrial controller; and
 in response to determining, based at least on the mapping rule, that the control structure corresponds to a type package object of the type package objects:
 execute a correlation of the control structure to the type package object; and
 generate, based at least on the correlation of the control structure to the type package object, a graphical object configured to enable display in a user interface of a property of the control structure for the component based at least on the mapping rule.

17. The reporting system of claim 16 wherein the reporting component is further configured to:
 in response to determining that the control structure corresponds to the type package object, display a dialog box in the user interface, wherein the dialog box identifies the control structure and the type package object; and
 receive user input via the dialog box comprising a confirmation of the correlation of the control structure to the type package object.

18. The reporting system of claim 17 wherein the reporting component is further configured to receive a second user input via the dialog box, wherein the second user input specifies a name of a project file, wherein the project file includes the control structure programmed in the industrial controller.

19. The reporting system of claim 16 wherein the mapping rule is configured to correlate at least the property of the control structure to at least a respective property of the type package object.

20. The reporting system of claim 16 wherein to execute the correlation of the data control structure to the type package object, the reporting component is further configured to bind at least the property of the control structure to at least a respective property of the type package object.

* * * * *